United States Patent [19]

Yoshimura et al.

[11] Patent Number: 4,498,078
[45] Date of Patent: Feb. 5, 1985

[54] SEWING MACHINE WITH A VOICE WARNING DEVICE

[76] Inventors: Motokazu Yoshimura; Michitaka Takiguchi; Fujio Horie; Koichi Hirata, all of c/o Brother Kogyo Kabushiki Kaisha, 35, 9-chome, Horita-dori, Mizuho-ku, Nagoya-shi, Aichi-ken, Japan

[21] Appl. No.: 336,944

[22] Filed: Jan. 4, 1982

[30] Foreign Application Priority Data

Jan. 23, 1981 [JP] Japan ................................ 56-9157
Jan. 29, 1981 [JP] Japan ................................ 56-12032

[51] Int. Cl.³ .......................................... G08B 21/00
[52] U.S. Cl. ................................. 340/679; 112/277;
340/692; 364/470; 364/550
[58] Field of Search ................ 340/677, 679, 692;
364/468, 469, 470, 513, 550; 112/272, 273, 277, 278

[56] References Cited

U.S. PATENT DOCUMENTS

4,256,047  3/1981  Suzuki et al. .................... 112/277
4,401,971  8/1983  Saito et al. ....................... 340/692
4,420,813 12/1983  Inoue et al. ...................... 364/513

Primary Examiner—Glen R. Swann, III

[57] ABSTRACT

A sewing machine aurally informs an operator of abnormal conditions which accidentally have taken, or are taking, place by means of a vocal indication. One group of speech data corresponding to an accidentally occurring abnormal condition is selected from among plural groups of speech data according to a detection signal from a plurality of abnormal condition detectors disposed in the machine. A voice signal corresponding to the selected group of speech data is generated in relation to operation of a manual device e.g. a button such as a switch, for the start of sewing. The operator can hear the warning voice due to this vocal indication simultaneously with the operation of the manual button for the start, whereby he/she is prevented from starting of the machine while the abnormal condition exists.

5 Claims, 10 Drawing Figures

SEWING MACHINE WITH A VOICE WARNING DEVICE

BACKGROUND OF THE INVENTION

This invention relates to a sewing machine which is capable of warning an operator, what and where an accidentally happened trouble is, by means of sound or voice.

Employment of a warning lamp for alarming an occurrence of a trouble or abnormal condition in a sewing machine to an operator has been traditionally well known. There can be various types of troubles to take place in sewing machines, such as breakage of an upper thread, overload of a drive motor, etc. In the conventional system, an occurrence of any one kind of trouble causes a warning lamp to be lit for visually alarming the operator. Mere lighting of the warning lamp is not enough to let the operator know specifically where and what kind of abnormal condition is taking place, and requires of the operator too much time for making proper repairs.

For solving this problem a sewing machine was provided, wherein an operator could be informed of the abnormal condition taking place therein by means of a sound or voice, which was disclosed by the present applicant in the specification of the patent application U.S. Ser. No. 264,613. Some problems are however still left unsolved even in that invention. If the operator of that sewing machine forgets the once heard alarm sound or continues a new operation without making proper repair, the machine may be damaged and even the operator may be injured.

SUMMARY OF THE INVENTION

A primary object of this invention which was made from such a background is to provide a sewing machine, wherein an abnormal condition taking place therein can be signalled to the operator by means of sound or voice in relation to starting of a sewing operation.

Another object of this invention is to provide a sewing machine wherein an alarm sound or voice can be repeatedly produced so as to surely tell the nature of the trouble to the operator.

Still another object of this invention is to provide a sewing machine, wherein if the machine is started for a sewing operation while a trouble is continued, the machine is stopped and warning voice is generated.

For the purpose of achieving the above-mentioned objects a sewing machine in accordance with this invention is provided with a memory for storing plural groups of speech data respectively representing a plurality of trouble contents, whereby one group of the speech data is selected by a detection signal from a cause detector, i.e., an abnormal condition detector, arranged in the machine, a voice signal according to the selected group of the speech data is generated from a voice signal generator in relation to an operation of a manual means for starting the sewing, and the operator is thereby allowed to catch the warning voice not later than the operation of the manual means and the warning voice is repeated, until the abnormal condition is removed, every time the manual means is operated.

Furthermore, a drive commanding circuit of a drive motor is constructed such that driving of the machine is not allowed simultaneously with generation of the warning voice. This structure permits the operator to accurately know the contents of the abnormal condition for surely protecting him/her from a danger caused thereby.

DETAILED DESCRIPTION OF THE PREFERRED EMBODIMENT

Figure 1:
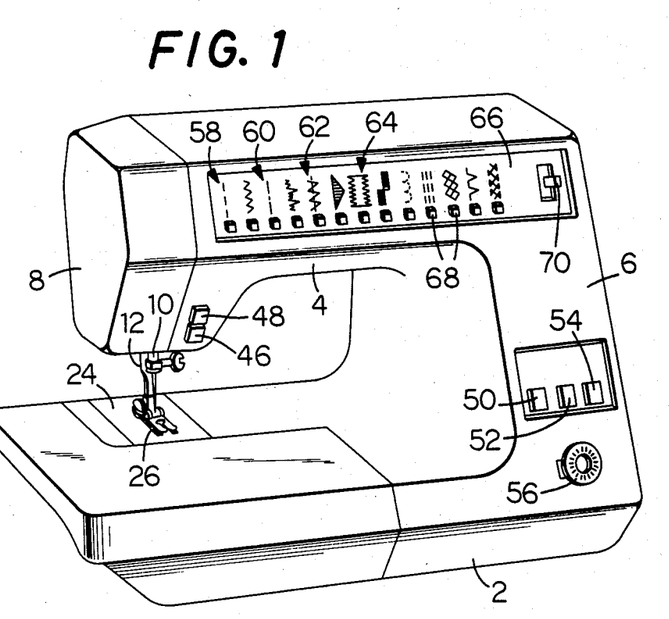
FIG. 1 is a perspective general view of an embodiment of a sewing machine in accordance with this invention.
Figure 2:
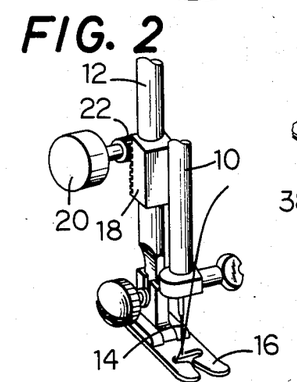
FIG. 2 is an enlarged view for showing the structure of a presser foot detector.

On a bed 2 of a machine frame a bracket arm 4 is, as can be seen in FIG. 1, horizontally disposed, being retained at one end thereof by a standard 6 in a cantilever status. On the free end side of the bracket arm 4 a head 8 is formed, in which a needle bar 10 is vertically reciprocable and laterally oscillatable due to known reciprocation, and oscillation mechanisms (neither is shown), and a presser bar 12 is movable up-and-down by operation of an operator. To the lower end of the needle bar 10 and the presser bar 12 a needle 14 and a presser foot 16 are respectively attached as shown in FIG. 2. To this presser bar 12 a rack 18 is secured, and a pinion 22, on the tip of whose rotary shaft a rotatable potentiometer 20 is fixed, is firmly disposed in the head 8 so as to engage with the aforementioned rack 18. Position of the presser foot 16 can be thereby electrically detected.

On the bed 2 just beneath the needle bar 10 a throat plate 24 is disposed, and in the middle portion thereof a feed dog 26 is placed for imparting a feed movement to a workpiece controlled by a not-shown but well-known feed regulating mechanism. The feed dog 26 and the needle bar 10, which constitute the stitch forming instrumentalities, enable relative movement between the needle 14 and the workpiece so as to form a desired stitch pattern on the workpiece.

Figure 3:
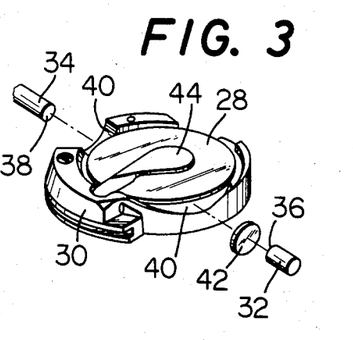
FIG. 3 is an enlarged view for showing the structure of a bobbin thread consumption detector.

Beneath the throat plate 24 a known mechanism for detecting bobbin thread consumption amount is disposed within the bed 2. On either side of a bobbin case 30 accommodating a bobbin 28 therein, as shown in FIG. 3 is disposed an optical fiber 32 for light projecting and an optical fiber 34 for light receiving which fibers are secured face-to-face at their respective end faces 36, 38. And the bobbin case 30 is provided with an opening 40 positioned on a straight line linking both end faces 36, 38, so as to pass light emitted from the end face 36 to the end face 38 when the bobbin thread wound on a bobbin 28 is decreased. Numeral 42 designates a convex lens and numeral 44 an arm for fixing the bobbin 28.

Disposed on the front lower side of the head 8 (noting FIG. 1) are a start-stop push button 46 which serves (1) as a manual means for starting and stopping a drive motor 192 (shown in FIG. 4B) and also for generating warning voice, and (2) as a back stitching push button 48 for forming a back stitch. On the front side at a lower portion of the standard 6 are a speech repeat push button 50 comprising a manual button operable to repeat voice outputting such as warning statement; a speech stop push button 52 for stopping the voice outputting; and a cause speech push button 54 for outputting a cause of an abnormal condition in the machine. Beneath these push buttons (50, 52, 54) is disposed a speaker 56 constituting a warning means for transmitting a warning statement. Fixed on the front side of the bracket arm 4 is a pattern display panel 66, on which symbols respectively representing thirteen kinds of stitch patterns such as straight stitching 58, basting 60, bar tacking 62, buttonhole stitching 64, etc. are displayed. Beneath each of those symbols are pattern selection push buttons 68, thirteen in all, to be operated for selecting a desired one stitch pattern out of the plurality. On the right side of the pattern display panel 66 a speech interrupt switch 70 for stopping any other sound than the abnormal condition warning voice in the machine is disposed.

Electric structure in a sewing machine with the above-mentioned make-up will be described hereunder with reference to FIG. 4.

Terminals on one side of switches 72, of the automatic return type, each of which are closed by depressing an associated pattern selection push button 68, are commonly ground, while terminals on the other side are respectively connected to a plus source via resistors 74 and to NAND gates 78 via inverters 76. A terminal of the speech interrupt switch 70 is grounded, while the other terminal thereof is connected via a resistor 80 to a plus source and also to the NAND gates 78 as well as a NAND gate 82. Furthermore, one terminal of a switch 84 of automatic return type which is closed in response to depressing of the cause speech push button 54 is grounded, while the other terminal is connected via a resistor 86 to a plus source and also to the NAND gate 82 via an inverter 88. While, therefore, the speech interrupt switch 70 is open, depressing of the pattern selection push button 68 will cause one of the thirteen signals from PS1 to PS13 corresponding to the push button 68 depressed to be selectively supplied from the NAND gates 78 to a pattern indication controlling circuit 90 as an "L" level signal. When on the other hand the cause speech push button 54 is depressed while the speech interrupt switch 70 is open, a cause speech command SSP is supplied from the NAND gate 82 to a sewing state indication controlling circuit 92. While the speech interrupt switch 70 is closed, however, each gate of the NAND gates 78 and 82 is closed so as to prevent outputting any of the signals PS1-PS13 and the cause speech command SSP.

Figure 5:
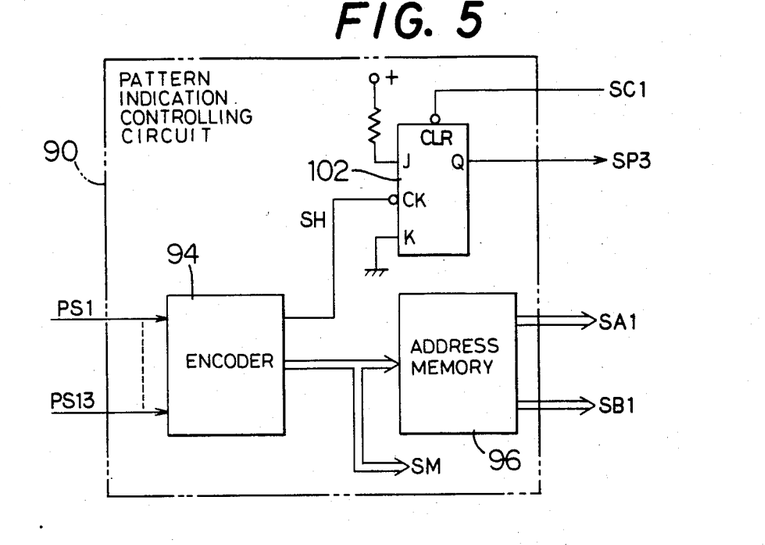
FIGS. 5–9 are respectively a block diagram for showing in detail a pattern indication controlling circuit, a sewing state indication controlling circuit, a warning indication controlling circuit, a timing logic circuit, and a motor drive commanding circuit in FIG. 4.

The pattern indication controlling circuit 90 is constructed as shown in the block diagram of FIG. 5. When any one of the signals PS1-PS13 is supplied to an encoder 94 a pattern code signal SM representing a selected stitch pattern is supplied to an address memory 96 and a known stitch data generator (not-shown) for positioning the needle bar 10 and a feed regulator. Supplied from the address memory 96 to input ports DA1 and DB1 of a multiplexor 100, are a start address signal SA1 representing start address and an end address signal SB1 representing end address in a later described speech data memory 98 as a memory means for permanently storing speech data, wherein plural groups of corresponding speech data are stored for displaying stitch patterns represented by the supplied pattern code signal SM in the form of voice. When on the other hand the encoder 94 is supplied with any one of the signals PS1-PS13, it supplies in turn an operation signal SH of "L" level to a clock terminal CK of a flip-flop circuit 102. The circuit 102 becomes a set status by the supply of the operation signal SH so as to supply a port select signal SP3 of "H" level from an output terminal Q thereof to a port select terminal G1 of the multiplexer 100 and a later described timing logic circuit 104. This status of the flip-flop circuit 102 is maintained until a latch completion signal SC1 from the timing logic circuit 104 is supplied to a clear terminal CLR thereof.

The pattern indication controlling circuit 90 is therefore, for the purpose of displaying the selected stitch pattern by operation of the pattern selection push button 68 in the form of voice, to supply a corresponding start address signal SA1 and end address signal SB1 to the multiplexor 100.

Figure 6:
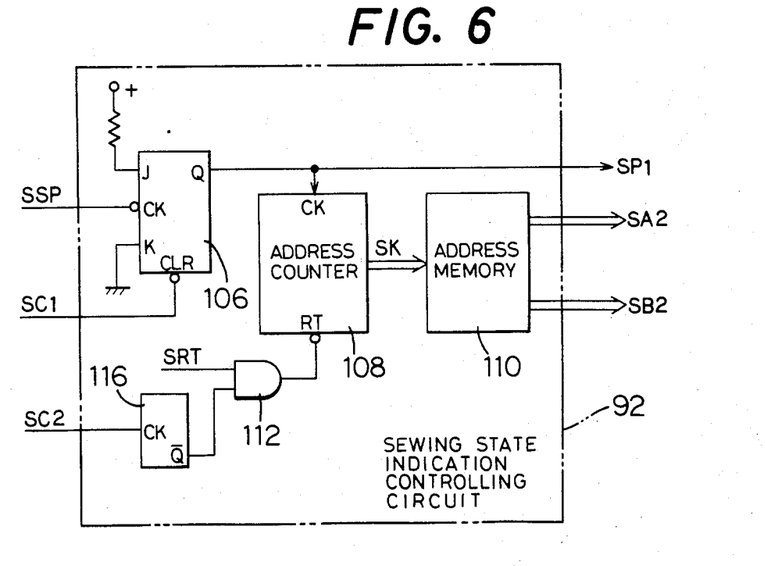

The sewing state indication controlling circuit 92 has a make-up illustrated in the block diagram of FIG. 6. More particularly, when a cause speech command SSP is supplied to a clock terminal CK of a flip-flop circuit 106, the latter is turned to a set state for supplying a port select SP1 of "H" level from its output terminal Q to a port select terminal G2 of the multiplexor 100, the timing logic circuit 104, and a clock terminal CK of an address counter 108. This status of the flip-flop circuit 106 is maintained until a latch completion signal SC1 is supplied to a clear terminal CLR thereof. The address counter 108 counts the port select signals SP1 and then supplies a signal SK representing the count content thereof to an address memory 110, and the count content is turned to zero by resetting the counter 108. When however the count content reaches "6" by counting the signals SP1 it is returned again to "1". In the memory 110, for indicating or displaying a cause of an abnormal condition in the form of voice in response to a supplied signal SK, a start address signal SA2 representing a start address of the speech data memory 98 and an end address signal SB2 representing an end address of the same are supplied to input ports DA2 and DB2 of the multiplexor 100. Further, the address counter 108 is supplied to a reset terminal RT thereof with a power on timing signal SRT, i.e., a pulse signal of "L" level, by way of an AND gate 112, and at the same time it is also supplied with a drive command SC2 from a later described motor drive commanding circuit 114 by way of a monostable multivibrator 116 and the AND circuit 112. The address counter 108 is thereby to be reset when at least either one of the power on timing signal SRT and the drive command SC2 is generated.

The sewing state indication controlling circuit 92 functions therefore, for displaying in voice the contents and causes of six kinds of irregular sewing states one after another in response to the operation of the cause speech push button 54, to supply a corresponding start address signal SA2 and end address signal SB2 to the multiplexor 100.

Also disposed in the sewing machine are an overload detector 118, a bobbin thread consumption detector 120 and a presser foot detector 122 as means for detecting occurrence of an abnormal condition which hinders normal stitch forming and generating a signal telling the detection thereof, are disposed.

The overload detector 118 for the drive motor 192 is provided with a known mechanism for detecting, while the drive command SC2 is being produced from the motor drive commanding circuit 114, the rotational state of the drive shaft and outputting a detection signal SDT1 if the number of rotations of the drive shaft has not reached a normal amount. Structure of the bobbin thread consumption detector 120 is composed of a mechanism illustrated in FIG. 3, a light source, and a light receiving element. When the light receiving element receives light emitted from the light source via both optical fibers 32, 34, a detection signal SDT2 is produced. The presser foot detector 122 includes a circuit which compares an output voltage of the potentiometer 20 corresponding to an actual height of the presser bar 12 shown in FIG. 2 with a predetermined reference voltage, and when the output voltage of the potentiometer 20 exceeds the reference voltage, a detection signal SDT3 is produced. All of those abnormal detection signals of "L" level (SDT1, SDT2, and SDT3) are respectively supplied to a warning indication controlling circuit 124 and the motor drive commanding circuit 114.

Figure 7:
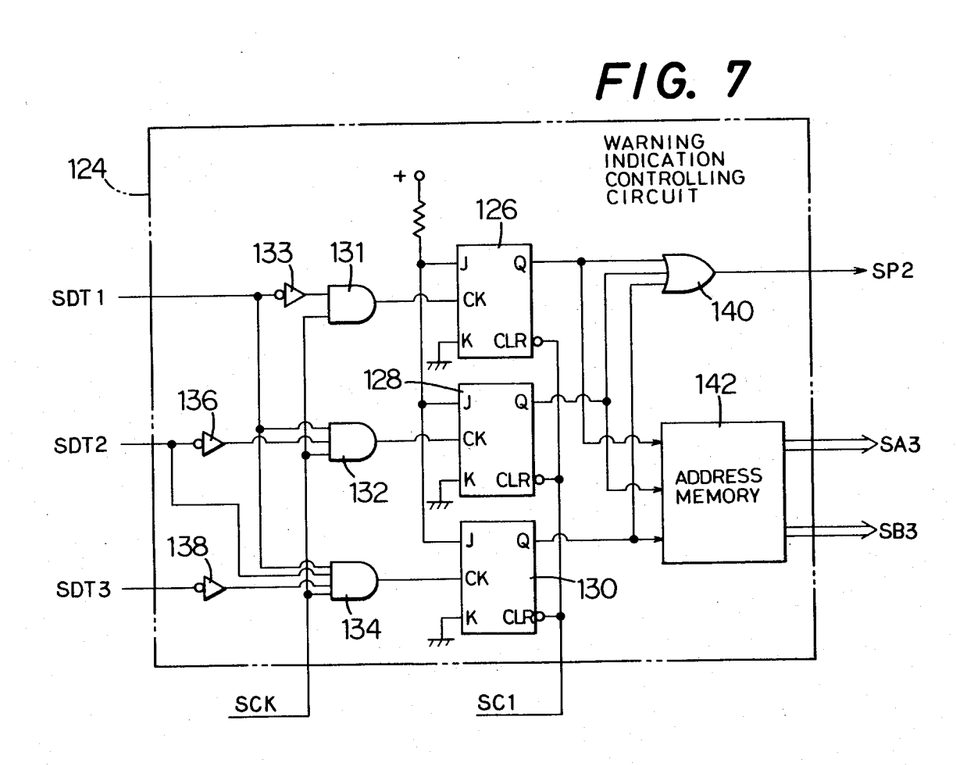

The warning indication controlling circuit 124, as means for actuating warning means in response to the operation of the foregoing manual means while abnormal condition is remaining, is constructed as shown in FIG. 7. The circuit 124 is provided with three flip-flop circuits 126, 128, and 130, wherein the latch completion signal SC1 is supplied to a respective clear terminal CLR thereof and a warning command SCK is supplied from the motor drive commanding circuit 114 to a respective clock terminal CK of the three flip-flop circuits 126, 128, and 130 by way of AND gates 131, 132, and 134. The detection signal SDT1 is respectively supplied via an inverter 133 and the AND gate 131 to a clock terminal CK of the flip-flop circuit 126, and via the AND gates 132 and 134 to clock terminals CK of the flip-flop circuits 128 and 130. The detection signal SDT2 is supplied via an inverter 136 and the AND gate 132 to a clock terminal CK of the flip-flop circuit 128, and via the AND gate 134 to a clock terminal CK of the flip-flop circuit 130. And the detection signal SDT3 is supplied via an inverter 138 and the AND gate 134 to a clock terminal CK of the flip-flop circuit 130. Output signals of "H" level representing set state of those flip-flop circuits 126, 128, and 130 are respectively supplied from an output terminal Q thereof to an OR gate 140 and an address memory 142. An output signal of the OR gate 140 is supplied as a port select signal SP2 to a port select terminal G3 of the multiplexor 100 and to the timing logic circuit 104. From the address memory 142, for displaying in voice an alarm respectively corresponding to the set state in the flip-flop circuits 126, 128, and 130, a start address signal SA3 representing a start address and an end address signal SB3 representing an end address in the speech data memory 98, where plural groups of speech data representing the alarms are stored, are supplied to input ports DA3 and DB3 of the multiplexor 100.

The warning indication controlling circuit 124 therefore functions for the purpose of displaying the alarm contents corresponding to the detection signal SDT1, the detection signal SDT2 and the detection signal SDT3 in voice, to supply the start address signal SA3 and the end address signal SB3 to the multiplexor 100 when a warning command SCK is generated, and to allow priority to the detection signal SDT1 over other detection signals SDT2 and SDT3 and allow priority to the detection signal SDT2 over the detection signal SDT3 when all of these signals are generated at a time.

In the multiplexor 100, while the port select signal SP3 is being supplied to the port select terminal G1 thereof, the start address signal SA1 and the end address signal SB1, which are being supplied to the input ports DA1 and DB1, are produced from output terminals QA and QB thereof to a start address latch 144 and an end address latch 146. While the port select signal SP1 is being supplied to the port select terminal G2 in a similar way, the start address signal SA2 and the end address signal SB2, which are being supplied to the input ports DA2 and DB2, are produced. Further, while the port select signal SP2 is being supplied to the port select terminal G3, the start address signal SA3 and the end address signal SB3 supplied to the input ports DA3 and DB3 are produced.

In the start address latch 144 and the end address latch 146, when the load signal SL is supplied from the timing logic circuit 104, the signal supplied from the multiplexor 100 to the input terminals thereof is temporarily memorized, and the signals representing the memorized contents are respectively supplied to an address counter 148 and an input terminal DA of a later described comparator 150.

Figure 8:
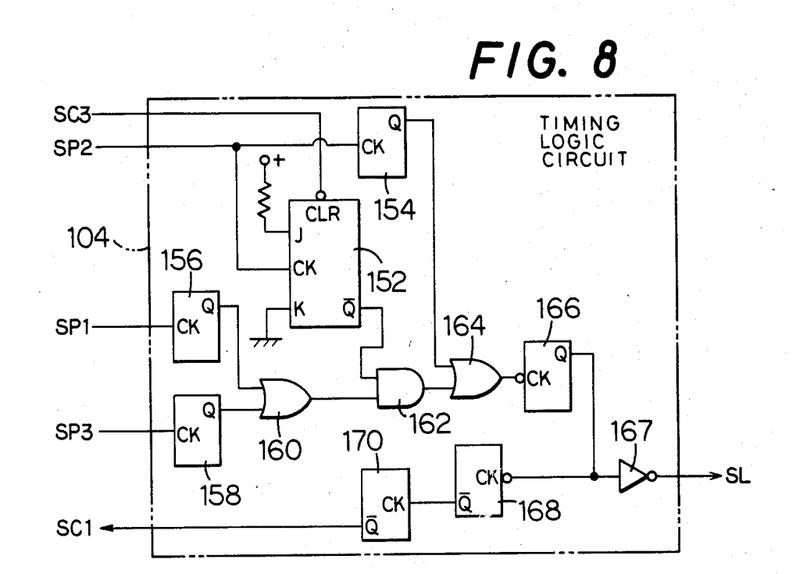

The timing logic circuit 104 is made up as shown in the block diagram of FIG. 8. There is a flip-flop circuit 152 provided therein, which receives a speech end signal SC3 from the comparator 150 at a clear terminal CLR thereof. The port select signal SP2 is supplied to a clock terminal CK of the flip-flop circuit 152 and a monostable multivibrator 154. The port select signals SP1 and SP3 are supplied via monostable multivibrators 156, 158 to an OR gate 160. An output signal of the OR gate 160 and an output signal of "H" level representing a reset state of the flip-flop 152 are supplied to an AND gate 162. An output signal from the AND gate 162 and an output signal from the monostable multivibrator 154 are supplied to an OR gate 164. An output signal from the OR gate 164 is supplied via a monostable multivibrator 166 and an inverter 167 to, as a load signal SL of "L" level, the start address latch 144 and the end address latch 146, and at the same time supplied via monostable multivibrators 166, 168, and 170 to, as a latch completion signal SC1 of "L" level, the pattern indication controlling circuit 90, the sewing state indication controlling circuit 92, the warning indication controlling circuit 124, and an AND gate 172. The timing logic circuit 104 functions therefore such that, when any one of the port select signals SP1, SP2, and SP3 is supplied, a load signal SL is output after a certain time span respectively corresponding to output pulse width of each of monostable multivibrators 156, 154, and 158, and when the output of the load signal SL is finished a latch completion signal SC1 is output after a certain time span corresponding to output pulse width of a monostable multivibrator 168. Furthermore when the port select signal SP2 is supplied first, outputting of load signals SL and latch completion signals SC1 based on the later supplied port select signals SP3, SP1 is blocked until the vocal indication of warning is finished.

Figure 9:
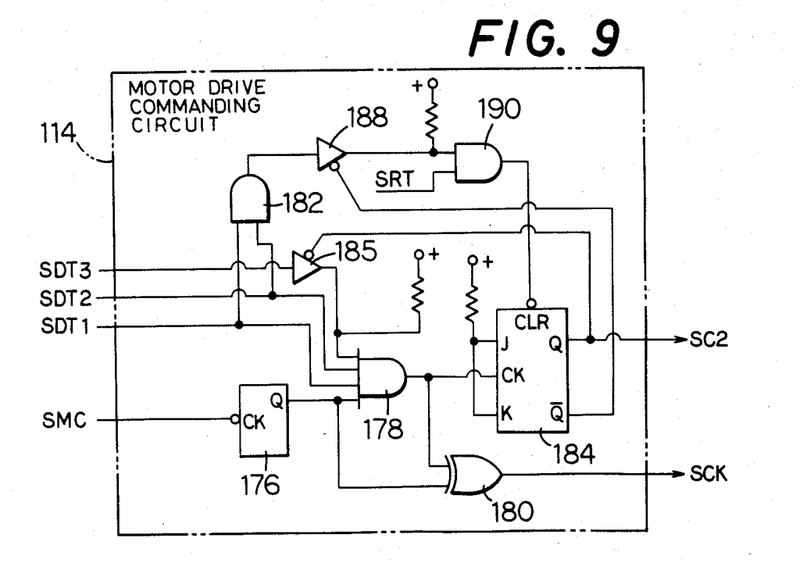

The motor drive commanding circuit 114, functioning as means for inhibiting drive means from driving the stitch forming instrumentalities regardless of the operation of the foregoing manual means while detection signal is generated, is made up as shown in FIG. 9. From a switch 174, which is closed in response to depressing of the start-stop push button 46 of automatic return type, an operation signal SMC of "L" level is supplied via a monostable multivibrator 176 to an AND gate 178 and an exclusive OR gate 180, while the detection signal SDT1 and the detection signal SDT2 are respectively supplied to the AND gate 178 and an AND gate 182 on one hand, while the detection signal SDT3 is supplied on the other hand to the AND gate 178 by way of a tristate buffer 185, which is conductive when an output terminal Q of a flip-flop circuit 184, externally connected for being operable as a so-called binary circuit, is at "L" level state. An output signal of the AND gate 178 is supplied to a clock terminal CK of the flip-flop circuit 184 and the exclusive OR gate 180, and an output signal from the exclusive OR gate 180 is supplied as the warning command SCK to the warning indication controlling circuit 124. And the drive command SC2 of "H" level which represents a set state of the flip-flop circuit 184 is supplied from its output terminal Q to the motor drive controlling circuit 186 and the overload detector 118. An output signal of the AND gate 182 is supplied together with the power on timing signal SRT via a tristate buffer 188, which is conducted when an output terminal $\overline{Q}$ of the flip-flop circuit 184 is at "L" level state, to an AND gate 190, and an output signal thereof is supplied in turn to a clear terminal CLR of the flip-flop circuit 184.

The motor drive commanding circuit 114 produces while none of the detection signal SDT1, the detection signal SDT2, or the detection signal SDT3 is supplied (that is to say a case all being of "H" level), alternately the drive command SC2 of "H" level and the stop command of "L" level at each inputting of the operation signal SMC; on the other hand, circuit 114 produces, while any one of the detection signals SDT1, SDT2, and SDT3 is being supplied, the warning command SCK in response to inputting of the operation signal SMC, and withdraws the output of the drive command SC2. If the detection signal SDT1 or the detection signal SDT2 is being output to the motor drive commanding circuit 114 the output of the drive command SC2 is ceased.

The above-mentioned motor drive controlling circuit 186 is a well-known one which supplies power to the drive motor 192, while the drive command SC2 is being supplied, for driving the motor at a preset speed.

As to switch 194, (referring again to FIG. 4B) one terminal thereof is grounded while the other is connected via a resistor 196 to a plus source as well as to a monostable multivibrator 198, whose output signal is supplied together with the latch completion signal SC1 to the AND gate 172. An output signal of the AND gate 172 is supplied to a clock terminal CK of a flip-flop circuit 200 and to a load terminal LD of the address counter 148.

One terminal of a switch 202, which is closed by depressing the speech stop push button 52, is grounded while the other is connected via a resistor 204 to a plus source as well as to a monostable multivibrator 206, whose output signal is supplied together with the speech end signal SC3 to an AND gate 208. An output signal of the AND gate 208 is supplied to a clear terminal CLR of the flip-flop circuit 200. An output signal of "H" level representing a set state of the flip-flop circuit 200 is supplied together with a clock pulse CP output from an oscillator 210 to an AND gate 212, whose output signal is supplied to a clock terminal CK of the address counter 148.

When therefore the speech repeat push button 50 is depressed or the latch completion signal SC1 is generated, the address counter 148 is loaded with an output signal of the start address latch 144, that is a start address signal, and a clock pulse CP is supplied to the clock terminal CK of the address counter 148, because the flip-flop circuit 200 is then at a set state. When however the speech stop push button 52 is depressed or the speech end signal SC3 is generated, the flip-flop circuit 200 is cleared and the clock pulse CP is blocked by the AND circuit 212 thereby failing to reach the address counter 148.

When the address counter 148 is supplied at its load terminal LD with a signal, an output signal of the start address latch 144 is loaded there. A value represented by this signal is added, by the clock pulse CP supplied to the input terminal thereof, through calculation, and a signal representing the calculated result is supplied to the speech data memory 98 and the input terminal DB of the comparator 150. This signal representing calculated contents functions as the address signal SD which designates one after another the speech data stored in the speech data memory 98.

In the comparator 150, when an end address signal supplied to an input terminal DA thereof agrees with an address signal SD supplied to an input terminal DB thereof, a speech end signal SC3 of "L" level is supplied from an output terminal QD thereof to the timing logic circuit 104, and at the same time it is supplied via monostable multivibrators 214, 216 to a reset terminal RT of the address counter 148.

In the speech data memory 98, plural groups of speech data SO are stored for vocal indication, such as those listed in TABLE I as an example, and when an address signal SD is applied to the speech data memory 98, the speech data SO designated by the address signal SD is supplied to a D/A converter 218. The speech data SO is a codified digital signal, and is converted in the D/A converter 218 to a voltage value which the speech data SO represents for being output. And a voice signal SG is approximately made by synthesizing the output signals from the D/A converter 218 represented by the corresponding group of speech data SO. This voice signal SG is supplied via an amplifier 220 to the speaker 56 for being vocally indicated therefrom. The speech data memory 98 and the D/A converter 218 constitute in this way a voice signal generator.

In the above description no concrete data or description about the digital data in the speech data memory 98 is provided, because the technology concerned to the digital data for the speech data is already known.

TABLE I

| No. | Statements of the Vocal Indication |
|---|---|
| 1 | "Straight Stitch. Use presser foot J." |
| 2 | "Basting. Use presser foot J, and lower the feed dog." |
| 3 | "Bar tacking. Use presser foot A, and lower the switch lever." |
| 4 | "Buttonhole stitching. Use presser foot A, and lower the switch lever." |
| 5 | "Don't feed the workpiece. Is not the feed dog lowered?" |
| 6 | "Is not the stitch length set at zero?" |
| 7 | "Is not the pressure adjusting lever set at zero?" |
| 8 | "Upper thread broken. Is not the way of thread stretching wrong?" |
| 9 | "Is not the thread tension too strong?" |
| 10 | "Is the needle attached rightly?" |
| 11 | "The machine has been locked. Read the instruction manual again." |
| 12 | "Bobbin thread is running short." |
| 13 | "Lower the presser foot." |

Operation of the Embodiment:

Operation of the embodiment will be described hereunder. When power is turned ON (by a not-shown switch the circuit in FIG. 4 is energized. By virtue of a power-on timing signal SRT, the address counter 108 (FIG. 6) is reset and the flip-flop circuit 200 is cleared. At the same time the other flip-flop circuits 102, 106, 126, 128, 130, 152, and 184 are all cleared through a not-shown circuit.

When one of the stitch patterns, for example a straight stitching 58, is selected as desired by operating one of the pattern selection push buttons 68, a signal PS1 corresponding to the straight stitching is supplied to the pattern indication controlling circuit 90. A start address signal SA1, an end address signal SB1, and a port select signal SP3 for vocally indicating the straight stitching from the pattern indication controlling circuit 90 and thereby produced. The start address signal SA1 and end address signal SB1 are supplied via the multiplexor 100 to the start address latch 144 and the end address latch 146. On the other hand, a load signal SL is produced from the timing logic circuit 104, after a certain time span from the generation of the port select signal SP3, causing the start address signal SA1 and the end address signal SB1 to be loaded in the start address latch 144 and the end address latch 146, and then to be supplied to the address counter 148 and the comparator 150. When a certain predetermined time has lapsed after the generation of the load signal SL, a latch completion signal SC1 is outputted from the timing logic circuit 104. The flip-flop circuit 200 is thereby set, and the start address signal SA1 is loaded in the address counter 148. And in the pattern indication controlling circuit 90 the flip-flop circuit 102 is cleared for restraining the output of the port select signal SP3. When the flip-flop circuit 200 is set the clock pulse CP is supplied via the AND gate 212 to the address counter 148, which adds the clock pulses CP one after another on the start address signal SA1 for outputting the count content as an address signal SD to the speech data memory 98 and the comparator 150. Speech data SO designated by the address signal SD are supplied one after another from the speech data memory 98 to the D/A converter 218 for being output therefrom as the voice signal SG. Vocal indication of the statement of No. 1 of TABLE I is started in this way as an output from the speaker 56. When the vocal indication is finished the content of the address signal SD comes to coincide with the end address signal SB1, causing the comparator 150 to output the speech end signal SC3. This results in clearance of the flip-flop circuit 200, followed by blocking the supply of the clock pulse CP with the AND gate 212, and resetting of the address counter 148 so as to make its content equal to zero, after a certain predetermined time span from the generation of the speech end signal SC3.

When other stitch patterns, such as basting 60, bar tacking 62, or buttonhole stitching 64, are selected by operation of the pattern selection push button 68 a similar operation to the above will be executed respectively so as to vocally indicate the statements in TABLE I, No. 2, No. 3 and No. 4 in that order.

When the start-stop push button 46 is depressed in the above-mentioned status, the flip-flop circuit 184 (FIG. 9) is given a set state due to the operation signal SMC which is supplied by way of the monostable multivibrator 176 and the AND gate 178, and the drive command SC2 is output from the flip-flop circuit 184. The drive motor 192 is thereby driven, followed by driving of a not-shown needle bar oscillation mechanism and feed regulation mechanism. A desired stitch pattern selected by the depression of the pattern selection push button 68 can be formed thereby on the workpiece. If the start-stop push button 46 is depressed again the flip-flop circuit 184 is reversed so as to block the output of the drive command SC2, with a result of halting of the drive motor 192.

In the course of the above-mentioned sewing operation causes of various accidental abnormal conditions, for example malfeeding of the workpiece, upper thread breakage, etc. are indicated vocally by depressing of the cause speech push button 54. When this push button is depressed the flip-flop circuit 106 (FIG. 6) is placed under a set state due to a cause speech command SSP for supplying the port select signal SP1 from the output terminal Q thereof to the address counter 108, the multiplexor 100, and the timing logic circuit 104. In the address counter 108, the port select signal SP1 is counted until the content thereof becomes "1" before the signal SK representing the resultant content is supplied to the address memory 110, from which a start address signal SA2 and an end address signal SB2 corresponding to the signal SK are output for being supplied in turn via the multiplexor 100 to the start address latch 144 and the end address latch 146. From the timing logic circuit 104, on the other hand, a load signal SL and a latch completion signal SC1 corresponding to the generation of the port select signal SP1 are output in the same way as the above so as to produce a series of vocal indications from the speaker 56 in respect of the statement standing in TABLE I as No. 5. The flip-flop circuit 106 is cleared by the latch completion signal SC1. By re-depressing the cause speech push button 54 at this time, the counted content of the address counter 108 becomes "2" for performing a series of the vocal indications of the No. 6 statement of TABLE I from the speaker 56. Afterwards at each depressing of the cause speech push button 54 the vocal indications from No. 7 to No. 10 of TABLE I are performed one by one, and further depressing of the cause speech push button 54 will cause a vocal re-indication of No. 5 of TABLE I. The operator is allowed therefore to investigate various causes of irregularities without the trouble of consulting the instruction manual for the machine.

The above described operation of the pattern selection push button 68 and the cause speech push button 54 ae related to a case wherein the speech interrupt switch 70 is open. When this speech interrupt switch 70 is closed, on the contrary, the NAND gates 78, 82 will restrain the output of their signals PS1–PS13 and the cause speech command SSP. In this case, therefore, generation of an operation commanding voice signal is ceased, while generation of a cause warning voice signal is permitted, so as to stop the vocal indication representing the contents of pattern selection operation and the causes of irregularities of sewing state in the machine. Skilled operators are thereby relieved from troubles of unnecessary vocal indications by means of only operating the speech interrupt switch 70.

When the start-stop push button 46 is depressed, if any one of the detection signals SDT1, SDT2, or SDT3 has been produced, an operation signal SMC which should be supplied to the flip-flop circit 184 (FIG. 9) is blocked by the AND circuit 178. The flip-flop circuit 184 is not brought to a set state, with a result of restraining the output of the drive command SC2 therefrom. It means that the AND circuit 178 is a prohibiting circuit for preventing the start of a stitch forming operation while any of the detection signals SDT1, SDT2, or SDT3 is generated. As one input terminal of the exclusive OR gate 180 is of "H" level and the other is of "L" level, a warning command SCK therefrom is supplied fo the warning indication controlling circuit 124. If for example a detection signal SDT1 is generated in the warning indication controlling circuit 124, at this time, the flip-flop circuit 126 (FIG. 7) is brought to a set state, which causes an input signal representing the set state thereof to be supplied via the OR gate 140 as a port select signal SP2 to the multiplexor 100 and the timing logic circuit 104, and further to the address memory 142. From this address memory 142 a start address signal SA3 and an end address signal SB3, which correspond to the detection signal SDT1, are output for being supplied via the multiplexor 100 to the start address latch 144 and the end address latch 146. In the timing logic circuit 104, after a certain predetermined time span from the supplying of a port select signal SP2, a load signal SL is output in a similar way to the above. After a certain predetermined time span from the output of the load signal SL a latch completion signal SC1 is output, and the flip-flop circuit 152 is placed at a set state. Even if, under this condition, another port select signal SP1 or SP3 is supplied, a load signal SL and a latch completion signal SC1 based on the signal SP1 or SP3 can not be output by being blocked by the AND gate 162 (FIG. 8). In other words, the flip-flop circuit 152 and the AND gate 162 make the vocal indication of warning finish in preference to the vocal indication of causes of irregularities in respect of stitch patterns and sewing state. Vocal indication of No. 11 of TABLE I is performed thereafter in the same manner as above-mentioned. Depressing operation of the start-stop push button 46 while the detection signal SDT2 is being generated causes the supply of a warning command SCK from the motor drive commanding circuit 114 to the warning indication controlling circuit 124 according to a similar operation stated above. In this warning indication controlling circuit 124 vocal indication of No. 12 of TABLE I is performed after the flip-flop circuit 128 is placed at a set state according to a similar operation stated above. Depressing the start-stop push button 46 while the detection signal SDT3 is being generated similarly brings the flip-flop circuit 130 to a set state for performing vocal indication of No. 13 of TABLE I.

As shown in FIG. 7 when the detection signal SDT1 is generated concurrently with the detection signal SDT2 or the detection signal SDT3, the AND gate 131 allows in the warning indication controlling circuit 124 only the flip-flop circuit 126 to be placed at a set state, and the AND gates 132, 134 block the flip-flops 128, 130 to be placed at a set state, for preferentially performing vocal indication of No. 11 of TABLE I. If overlapping generation of the detection signal SDT2 and the detection signal SDT3 should occur, the blocking of the AND gate 134 similarly allows only the flip-flop circuit 128 to be placed at a set state for performing vocal indication of No. 12 of TABLE I.

When the detection signal SDT1 or the detection signal SDT2 is generated while the drive motor 192 is in rotation, either one of the two is supplied, in the motor drive commanding circuit 114, to the flip-flop circuit 184 by way of the AND gate 182, the tristate buffer 188, and the AND gate 190. The flip-flop circuit 184 is thereby cleared to automatically stop the drive motor 192.

Even when the start-stop push button 46 is operated while the machine is in an abnormal condition, vocal warning is made in parallel with halting of rotation of the drive motor 192 is the above-mentioned manner, which enables prevention of continuing of machine operation under an abnormal condition. It even permits the taking of necessary steps for remedying the irregularities in advance. Furthermore, the vocal warning can surely be performed without being hindered by other pattern sewing state indications, and an important vocal warning is given preference to other indications when plural abnormal conditions take place concurrently. It allows proper treatments to be made speedily and surely.

When the operator has not heard the contents of a vocal indication or left something unheard, (for example in No. 1 of TABLE I), all that he/she has to do is to depress the speech repeat push button 50 to reproduce the indication. When the speech repeat push button 50 is depressed an output signal of "L" level from the monostable multivibrator 198 is supplied via the AND gate 172 to the flip-flop circuit 200 and the address counter 148. The start address signal SA1 which is latched at the start address latch 144 for the vocal indication is loaded in the address counter 148. At the same time the flip-flop circuit 200 is placed at a set state, and a clock pulse CP is supplied from the oscillator 210 to the address counter 148 by way of the AND gate 212. According to a similar operation the vocal indication of the matter shown in No. 1 of TABLE I is to be repeated.

In this way the operator is allowed, even when he/she accidentally failed to hear a vocal indication, to repeat it as needed so as to accurately or surely catch the contents thereof.

When a vocal indication is started, for example No. 1 of TABLE I, a skilled operator may be well aware of the second half of the content to be indicated, i.e., what kind of pressure foot should be used. In such a case only the vocal indication of a stitch pattern selected, for the purpose of making sure what kind pattern has been selected, is sufficient, and half way through the vocal indication the speech stop push button 52 is operated. This operation causes an output signal of "L" level from the monostable multivibrator 206 to be supplied via the AND gate 208 to the flip-flop circuit 200. The flip-flop circuit 200 is thereby cleared so as to block the clock pulse CP which has been supplied from the oscillator 210 to the address counter 148 at the AND gate 212. Counting operation in the address counter 148 is therefore stopped to restrain the later vocal indication.

The vocal indication can thus be interrupted according to the necessity of the operator; thus, a skilled operator can be relieved of the unnecessary vocal indication in order to start the sewing operation as early as he/she desires.

The above description is concerned to only one embodiment of this invention. It goes without saying therefore that various modifications and variations may be made by those skilled in the art within the scope and spirit of this invention.

Figure 4A:
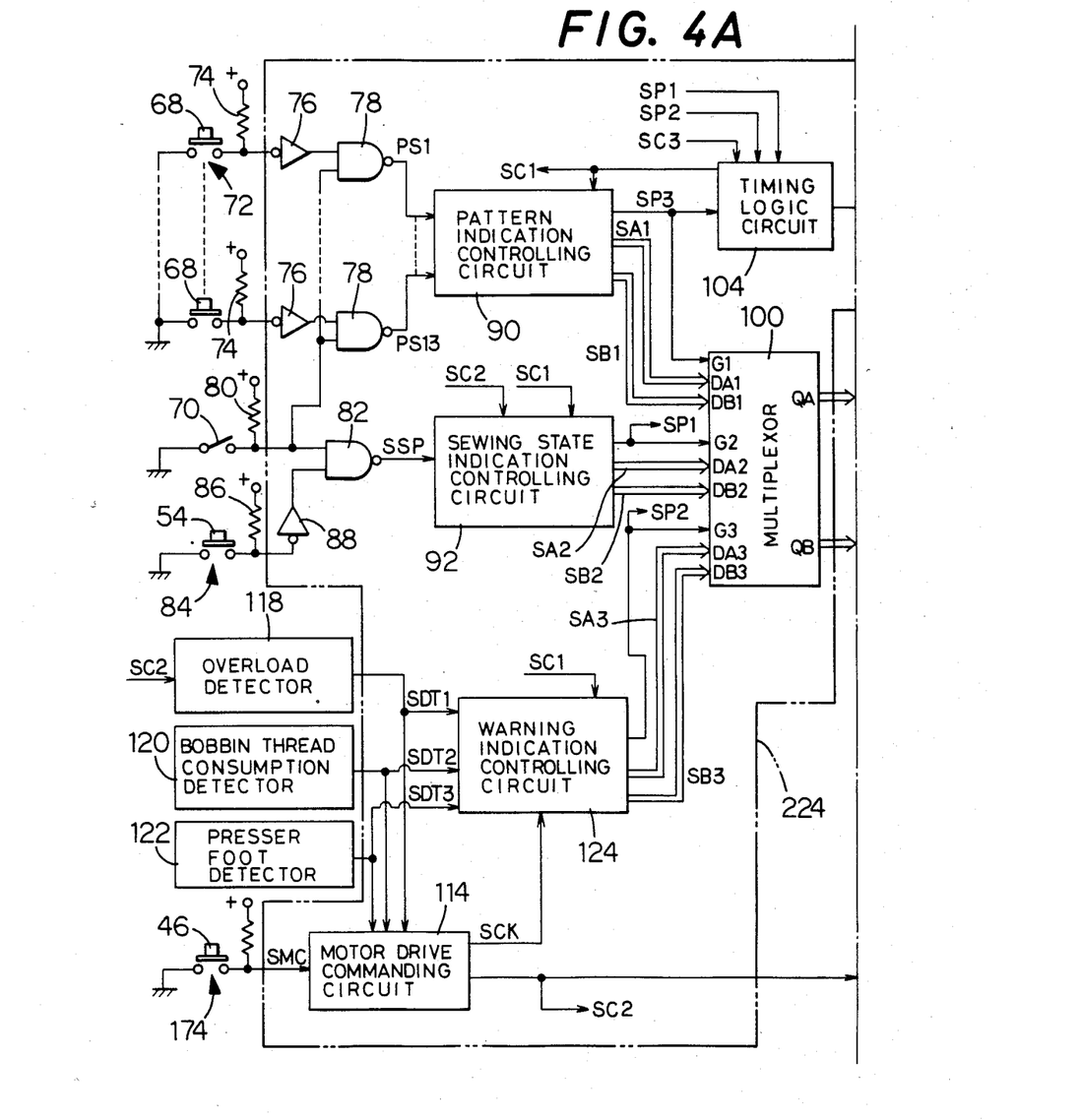
FIGS. 4A and 4B are a block diagram for showing a circuit structure in this embodiment.
Figure 4B:
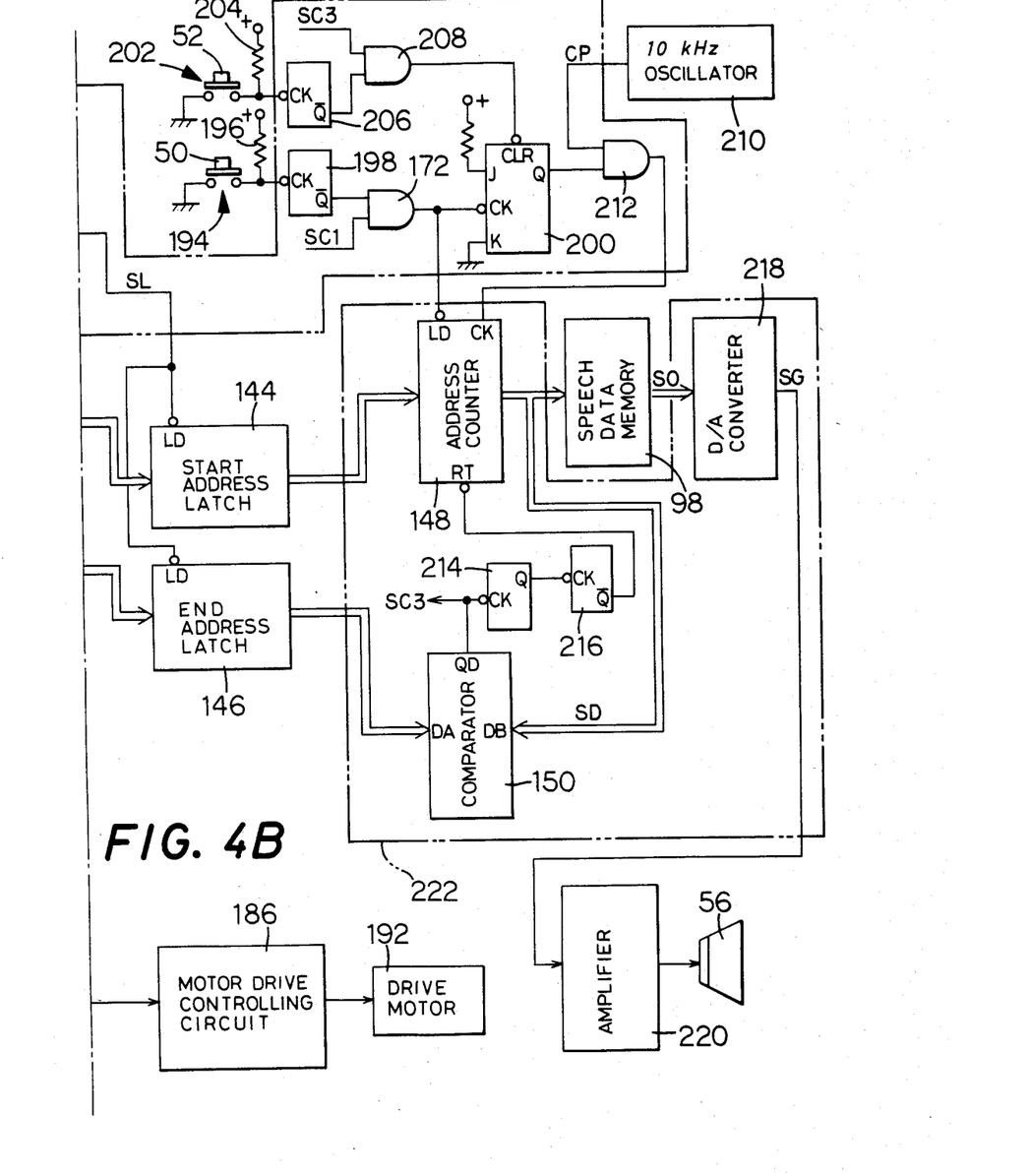

For example, unlike the above embodiment, wherein a voice synthesizer 222 as means for controlling memory means is composed, in the circuit make-up shown in FIG. 4, of the address counter 148, the comparator 150, the monostable multivibrators 214, 216 and the D/A converter 218, and speech data stored in the speech data memory 98 are synthesized into voice according to the PCM system, i.e., Pulse Code Modulation system, another system of voice synthesizing such as PARCOR, i.e., Partial Auto Correlation system, wherein capacity of a memory can be reduced to a great extent, is permissible. As voice synthesizer 222 in the latter case, HD 38880, as LSI of HITACHI SEISAKUSHO, Ltd. (Japan) and TMCO 280, an LSI of TEXAS INSTRUMENT CORP. (U.S.A.) are well known as suitable.

In the circuit structure of FIG. 4, a data processing circuit 224 is composed of the pattern indication controlling circuit 90, the sewing state indication controlling circuit 92, the warning indication controlling circuit 124, the timing logic circuit 104, the motor drive commanding circuit 114, the AND gates 78, 82, 172, 208, 212, the inverters 76, 88 and the monostable multivibrators 198, 206. This data processing circuit 224 may be constituted of a so-called microcomputer. In such a case, the start address latch 144 and the end address latch 146 may be generally constituted of a random access memory (RAM) and the speech data memory 98 is constituted of a read only memory (ROM).

Further, the number of pattern selection push buttons 68, cause speech push button 54, and detectors for detecting abnormal conditions in the machine may be varied in many ways according to the function of the machine, and similarly kinds and contents of vocal indication shown in TABLE I may be varied in many ways.

What is claimed is:

1. A sewing machine having manual means and drive means responsive to the operation of the manual means for actuating stitch forming instrumentalities to form a stitch pattern, said sewing machine comprising:
   (a) means for detecting an abnormal condition which prevents the operation of said instrumentalities and then generating a signal;
   (b) memory means for permanently storing at least one group of speech data;
   (c) means for controlling said memory means to output said group of speech data in response to the operation of said manual means while said signal is present; and
   (d) means for speaking a warning statement concerning said abnormal condition responsive to the output of said group of speech data.

2. A sewing machine as set forth in claim 1, wherein said memory means stores plural groups of speech data which respectively correspond to plural abnormal conditions supposed to take place in said sewing machine, and said controlling means designates one of said plural groups and then controls said memory means to output the designated group of speech data.

3. A sewing machine as set forth in claim 1, including a manual button operable to repeat said warning statement.

4. A sewing machine as set forth in claim 1, including means for inhibiting said drive means from driving said instrumentalities regardless of the operation of said manual means while said signal is being generated.

5. A sewing machine having manual means and drive means responsive to the operation of the manual means for driving stitch forming instrumentalities to form a stitch pattern therewith, said sewing machine comprising:
   (a) warning means disposed in said sewing machine for speaking a warning statement concerning at least one abnormal condition which prevents the operation of said instrumentalities; and
   (b) means for actuating said warning means in response to the operation of said manual means while said abnormal condition is present.

* * * * *